United States Patent [19]

King

[11] Patent Number: 5,983,366
[45] Date of Patent: Nov. 9, 1999

[54] DATA PROCESSING SYSTEM HAVING MONITORING OF SOFTWARE ACTIVITY

[75] Inventor: Michael Roy King, Axams, Austria

[73] Assignee: Optimay Corporation

[21] Appl. No.: 08/820,836

[22] Filed: Mar. 19, 1997

[51] Int. Cl.$^6$ ................................................. G06F 11/00
[52] U.S. Cl. .......................................................... 714/38
[58] Field of Search ...................... 395/183.14, 183.15, 395/183.21, 184.01, 185.04, 183.22, 704, 705, 712; 371/25.1, 27.5

[56] References Cited

U.S. PATENT DOCUMENTS

| | | | |
|---|---|---|---|
| 3,707,725 | 12/1972 | Dellheim | 395/185.14 |
| 4,802,165 | 1/1989 | Ream | 395/183.14 |
| 5,121,489 | 6/1992 | Andrews | 395/183.14 |
| 5,124,103 | 6/1992 | Hill et al. | 395/183.21 |
| 5,297,274 | 3/1994 | Jackson | 395/183.11 |
| 5,347,649 | 9/1994 | Alderson | 395/183.04 |
| 5,642,478 | 6/1997 | Chen et al. | 395/183.21 |
| 5,671,351 | 9/1997 | Wild et al. | 395/183.14 |
| 5,748,964 | 5/1998 | Gosling | 395/183.14 |

*Primary Examiner*—Robert W. Beausoliel, Jr.
*Assistant Examiner*—Pierre E. Elisca
*Attorney, Agent, or Firm*—Dickstein Shapiro Morin & Oshinsky LLP

[57] ABSTRACT

A method of tracing execution of a computer program of a data processing system with print messages is disclosed. The method includes providing a trace definition file containing a plurality of trace definitions, each trace definition is an encoded identification of each print message to be used with the tracing of execution of the computer program of the data processing system and a format display specification of an output for providing a trace of the execution of the computer program; providing information from the trace definition file to the data processing system which is executed with the computer program; providing information from the trace definition file to a host processor; the host processor communicating with the data processing system to identify selected parts of the computer program to be traced; in response to execution of the computer program transmitting trace information from the data processor to the host processor associated with the selected parts of the application program being traced; and the host processor, in response to transmission of the trace information from the data processor and in response to the information provided from the trace definition file causing the output for enabling tracing of the execution of the selected parts of the computer program.

36 Claims, 5 Drawing Sheets

Microfiche Appendix Included
(2 Microfiche, 196 Pages)

DATA PROCESSING SYSTEM HAVING MONITORING OF SOFTWARE ACTIVITY

TECHNICAL FIELD

The present invention relates to the monitoring and the tracing of execution of software in data processing systems and, more particularly, to the monitoring and tracing of execution of applications programs in data processing systems such as GSM transceivers.

BACKGROUND ART

The GSM communication system (global system for mobile communications) is a TDMA telecommunications system providing time multiplexed communications between mobile units and base stations contained in the GSM communication system. The GSM communication system, including transceiver units, is defined by published specifications which have been adopted over the years. The totality of the GSM published specifications are expressly incorporated by reference herein in their entirety.

The functionality of a GSM transceiver in the GSM communication system is defined by the aforementioned GSM specifications and includes a multilayer protocol stack containing software executed with a microprocessor. A first layer of the protocol stack interfaces with the hardware and controls communications to and from the second and third protocol layers. The second and third protocol layers control communications to and from the first layer and utilize services provided by the first protocol layer to communicate between the GSM network. The communications between the GSM network and GSM transceivers are time multiplexed into GSM frames. Each GSM frame has a fixed time duration and is divided into multiple segments each containing a plurality of bits all in accordance with the aforementioned published GSM specifications.

FIG. 1 illustrates a block diagram of a prior art transceiving unit which is disclosed in a catalog entitled "ICs for Communications" published by Siemens AG and identified as Product Overview 09.95. Standard functional notations are utilized to identify the functional elements in the block diagram of FIG. 1. Only a brief overview description of FIG. 1 will be given to describe the overall design of a GSM transceiver in which the present invention may be practiced and its relationship to a GSM network.

The GSM transceiver 10 is a double conversion heterodyne PM receiver with phase shifting circuitry for I/Q demodulation. Antenna 12 is connected through filter 14 to low noise amplifier 16 which is in turn connected to filter 18. The output of filter 18 is connected to mixer 20 which shifts the received signal down to an intermediate frequency. The output of mixer 20 is connected to filter 22 and the output of filter 22 is connected to amplifier 24. The output of amplifier 24 is connected to mixer 26 which shifts the signal to the baseband. The output of mixer 26 is connected to amplifiers 28 whose I and Q outputs are respectively connected to filters 30 having outputs applied to A to D converters 32. The outputs of the A to D converters 32 are connected to a digital signal processor 34 which includes filters 36 which are connected to the outputs of the A to D converters 32, a soft equalizer 38 which is connected to the output of the filters 36 and a speech and channel decoder 40. The output of the speech and channel decoder 40 is connected to filter 42 whose output is connected to D to A converter 44 whose output is applied to amplifier 46 which drives speaker 48 to provide audio to a user. Speech of the user is detected by microphone 50 which is connected to amplifier 52 having an output connected to A to D converter 54. The output of A to D converter 54 is connected to filter 56 having an output connected to speech and channel encoder 58. The outputs of speech and channel encoder 58 are connected to a GMSK encoder 60 having a pair of outputs which are applied to D to A converters 62 with the outputs thereof being connected to filters 64 which respectively output I and Q signals. The I and Q signals are connected to mixers 66 which are driven by RFVCO 68 to convert the signal from the baseband to the RF band. The output of mixers 66 is connected to output stage 68'. The output of output state 68 is connected to filter 70. The output of filter 70 is connected to output amplifier 72 which is controlled by a power amplifier control 74 in the form of a D to A converter. Microprocessor 76 controls the overall system including the power amplifier control 74 and provides a system interface 77. The system interface 77 generates chip select signals, internal clock signals, GSM specific control and timing signals via programmable timers for programmable interrupts on timer values and provides a chip card interface to a SIM card 78. The interface 77 also provides connectivity to a keypad 80. The microprocessor 76 is connected to a E$^2$PROM 82, a flash memory 85, and RAM 86.

As illustrated, a GSM network 84, which is in accordance with GSM specifications including base stations and related switching architecture, transmits and receives communications between individual transceiver units 10 via RF transmission 87. The communications are time multiplexed into GSM frames each containing 8 time slots each containing multiple bits. Base stations (not illustrated) of the GSM network 84 each have an antenna 88 which transmits and receives the aforementioned time multiplexed GSM frames.

Each GSM transceiver, such as the unit 10 illustrated in FIG. 1 in accordance with the published GSM specifications, has a multilayer protocol stack including first, second and third layers. Instructions must be issued to the hardware to allow the hardware to perform in accordance with the published GSM specifications in the GSM frames with either a frame advance or a frame delay which is required to be an integer multiple of the time duration of a GSM frame. This permits designers of hardware for implementing GSM transceivers to provide for pipeline frame delays or frame advances in terms of an integer multiple of the time duration of a GSM frame between the protocol stack and the hardware which suit the design requirements of the hardware. The first three layers of the GSM protocol stack conforms to the overall OSI network model for providing a universal multi-layer protocol stack.

FIG. 2 illustrates a block diagram of a GSM prior art multiple layer protocol stack 100 of the type utilized with a transceiver unit 10 of FIG. 1. The overall protocol stack 100, as illustrated, may be associated with hardware 102 which is represented by the hardware 10 of FIG. 1. Layers 2 and 3 identified by reference numeral 104 are well known and comply with the published GSM specifications including timing requirements. Layer 2 implements the LAPDm protocol specified in GSM specifications 04.05 and 04.06 which specify the transceiver protocol. Layer 3 conforms to GSM specifications 04.07, 04.08 and 04.8x and is described in more detail below in conjunction with FIG. 3. Layer 1, which is identified by reference numeral 106, is comprised of multiple software modules which exist in diverse implementations for performing the overall functions contained in the layer 1 block diagram.

Cyclic scheduler 108 takes a GSM channel configuration description from layer 3 and arranges for appropriate instructions to be given to the GSM encoding and decoding subsystem 102 at the required times in order for the required channel structure to be implemented. The channel configurations are described in GSM specifications 05.02, section 6.4.

Non-cyclic scheduler 110 performs the task of scheduling instructions to be carried by out by layer 1 which do not occur on a cyclical basis. The scheduled instructions typically are requests from the layer 3 to deliver information about base stations other than the base station currently camped onto by the transceiver unit 10 which is controlled by the cyclical scheduler 108. The non-cyclical scheduler 110 finds idle GSM frames into which requests from the layer 3 can be placed without interfering with the ongoing work of the cyclic scheduler 108.

Downlinked statistics and control 112 performs the task of monitoring the absolute radio frequency channel control number to determine the absolute power and reception quality as measured in accordance with GSM published specifications 05.08, chapter 8. The result is reported to the layer 3. Synchronization and MS carrier frequency are maintained as specified in GSM specifications 05.10, section 6.

Uplink control 114 functions to control the uplinked transmitted power of the transceiver on a frame by frame basis as ordered by the base station in accordance with published GSM specifications 05.08, section 4.7.

FIG. 3 illustrates a block diagram of the three layer protocol stack 200 associated with the hardware 202 of a GSM transceiver which may be as illustrated in FIG. 1 and a user interface 204 which is implemented to conform to GSM specifications 0.2.30 permitting different product configurations. Layer 1 is identified by the legend "L1" and reference numeral 106 and layer 2 is identified by the legend "L2" and reference numeral 206. Layer 1 conforms to the description of FIG. 2. Layer 3 is identified by reference numeral 208 and performs a plurality of functions as described below. Speech 210 is transmitted between the hardware 202 and the user interface 204. Data 212 is transmitted between hardware 202 and the user interface 204.

The purpose of the User Interface layer 204 is to provide an entity which allows the user to interact with the transceiver in a controlled way. The User Interface 204 guides the user through any interaction that may occur between the user and the other layers within the protocol stack 200. The user interface 204 is an application specific part of a transceiver, and as such, does not form a part of the protocol stack.

Specifically, the user interface 204 is required by the GSM specifications to provide the user with the means to perform the following functions:

(1) To Authenticate the user with the SIM card 78 via the personal identification number (PIN) procedures. In order to do this, the user interface 204 must make use of the services provided thereto by the interface between the SIM entity 224 described below and the user interface.

(2) To allow the user to switch the transceiver into manual or automatic network selection mode. In order to do this, the user interface 204 must make use of the services provided to the UI by the UI-MM interface.

(3) To allow the user to select a network from a list of available networks. In order to do this, the user interface 204 must make use of the services provided to the user interface by the interface between the mobility management entity 216 described below and the user interface.

(4) To provide the user with a service indicator which indicates whether the user has GSM service available or not, making use of information provided via the interface between the mobility management entity 216 described below and the user interface 204.

(5) To provide the user with an indication of the Network (PLMN) into which the user is currently booked. This is done using information provided to the user interface 214 by the mobility management entity 216 via the interface therebetween.

(6) To provide the capability of making an emergency call by entering the number '112'. In order to do this, the user interface 204 must make use of the services provided to the user interface by the mobile network entity 220 described below via the interface therebetween.

(7) To allow the user to control the supplementary services entity 226 described below via a set of instructions defined in the GSM specifications. This is performed using the services provided by the supplemental services entity via the interface therebetween.

In addition, any normal user interface 204 will provide a large number of additional features such as Call Establishment, Abbreviated Dialling numbers, entering, sending and reading short messages, etc.

Radio resources entity 214 performs a plurality of functions specified by GSM specifications 04.07 and 04.08. The radio resources entity 214 is that part of layer 3 of the protocol stack 200 which performs the signalling protocols necessary to control layer 1 and layer 2 to establish and maintain a wireless link between the transceiver and the GSM network. The radio resources entity 214 configures and controls layer 1 so that passive and active connections can be maintained between the transceiver and a base station. The responsibilities of the radio resources entity 214 are divided into a number of subtasks as follows:

The first subtask of the radio resources entity 214 is cell selection which involves searching for all base stations. This is performed by determining the signal strengths for the candidate channels, and then, in decreasing signal strength order, determining whether these channels are indeed base station broadcast channels (BCCh). The BCCh broadcast information for base stations must be decoded to determine the suitability of the base station. It must be determined whether the base station belongs to the network requested by the mobility management entity 216. If unsuccessful, details of all available networks are passed up to the mobility management entity 216 where the decision is made to select a particular network. The decision to select a particular network is passed down to radio resources entity 214 where the best base station for this network is then selected as a server base station. It should be noted that while the radio resources entity 214 has the responsibility for selecting a particular base station, the mobility management entity 216 is responsible for selecting the network. This includes handling automatic and manual network selection.

The next subtask is idle mode monitoring. After the transceiver has camped on a particular base station, radio resources idle mode monitoring must then monitor the base station and the neighboring base stations to determine whether the current serving base station remains suitable. Once the radio resources entity 214 determines that the current base station is not the most suitable, a message is passed to the mobility management entity 216 when then orders the radio resources entity to perform a further cell selection on the basis of its stored information. The paging channel must be continuously monitored in order to see if the mobile is being called. The radio resources entity 214 has a stored TMSI and IMSI and if these correspond to an identity found on the paging channel, then the mobility management entity 216 is informed that the transceiver may be being paged. In fact, only the mobility management entity 216 knows whether the TMSI and IMSI are valid. CB-SHORT message services are sent on the cell broadcast channel. The radio resources entity 214 must piece these messages together and pass complete messages to the short messages services entity to support this service.

The next task is dedicated connection establishment. The radio resources entity 214 is responsible for establishing a dedicated connection when requested to do so by the mobility management entity 216. It uses its knowledge of the base station to control the layer 1 identified by reference numeral 106 in order to establish a channel in the current serving base station using the random access procedures. The radio resources entity 214 instructs the first layer 106 to send an access burst on the random access channel. It then monitors the access grant channel for a response corresponding to the access burst. If such a response occurs, the radio resources 214 then instructs the first Layer 1 to seize the channel indicated in the response. If no such response occurs, the process is repeated a maximum number of times before a failure is indicated to the mobility management entity 216. Seizing the channel consists of informing Layer 1 of the channel to use and requesting Layer 2 identified by reference 206 to establish multiple frame operation on the channel.

The next task is modifying the channel. When a dedicated channel has been established, the radio resources must respond to instructions from the base station in the form of messages from Layer 3 identified by reference numeral 208 messages to control the dedicated channel. These instructions include changes in the physical channel used (intra-cell handovers), changes between base stations (inter-cell handovers), or minor modifications to existing channels. These channels involve correct sequencing of the operations of both the second layer and the first layer (second layer suspends/resumes operations of the protocol stack). These changes are largely transparent to the higher layers of the protocol stack.

There are three possible ways in which a dedicated channel may be released. These are, on command of the base station, on command of the mobility management entity 216, or when the radio resources entity 214 detects specific error on the link. Once again, this requires correct sequencing of the activity of Layer 1 and Layer 2. Having released the channel, the radio resources entity 214 waits for instructions from mobility management entity 216 to select an appropriate base station.

The next task is dedicated mode monitoring. While a dedicated channel is active, the radio resources entity 214 must control Layer 1 to perform appropriate monitoring of the neighboring cells in order to present measurements reports to the base station. This is done so that the base station can make suitable decisions about controlling power levels and when an inter-cell handover should be performed.

The last task is Layer 3 message transfer. Layer 3 messages from higher level entities in the protocol stack are relayed through the radio resources entity on their way to layer 2.

The mobility management entity 216 follows the GSM specifications 02.11, 04.07 and 04.08. The mobility management entity 216 is that part of layer 3 of the protocol stack which performs the signalling protocols necessary to establish and authenticate services provided by the GSM network.

The mobility management entity 216 performs three major activities. These are network selection, as specified in GSM specifications 02.11, registration and authentication functions as specified in GSM specification 04.08 4 and connection management functions.

The mobility management entity 216 performs network selection. On the basis of information stored on the SIM card 78 of FIG. 1, the mobility management entity 216 is responsible for indicating to the radio resources 214 which network should be sought by the radio resources entity 214 when selecting cells upon which to camp. If the radio resources entity 214 is unsuccessful in this activity, the mobility management entity 216 is then responsible for choosing an alternative network on the basis of information returned by the radio resources entity 214. This may be on the basis of the network selection field on the SIM card 78 or user intervention, whereby the user selects a network from a list of networks presented in the user interface.

A second responsibility of the mobility management entity 216 is to control the period for re-attempts of cell selection in the absence of any useful signals.

The network selection responsibilities of the mobility management entity 216 also involve the storage of the neighboring cell information on the SIM card 78, so that the radio resources entity 214 can perform stored-information cell selection. It should be noted that the radio resources entity 214 does not automatically reselect other cells even when they belong to the chosen network.

The mobility management entity 216 performs registration and authentication. The mobility management entity 216 is responsible for recognizing the conditions where location updating should be performed, and for responding to mobility management messages from the base station pertaining to both registration and authentication. Both registration and authentication involve interactions with the SIM manager either to perform the authentication, or to insure that the SIM card 78 contents reflect the location update status of the transceiver. It should be noted that the majority of the activities are under the control of the base station, and having recognized the requirements to perform a location update, the mobility management entity 216 simply follows the instructions of the base station as specified as mobility management comment procedures in GSM specifications 04.08 4.3. The exception to this general principal is when errors occur, when the mobility management entity 216 performs the actions for abnormal cases as specified in GSM specifications 04.08, 4.4.4.8.

The mobility management entity 216 also performs connection management. The mobility management entity 216 is responsible for recognizing the requirement for a dedicated connection with a base station. This is a result of either a legitimate request for the connection management layer, or the result of a valid paging message from the base station. A further function of the mobility management is that it keeps track of open connection management layer transactions of the third layer so that it can automatically disconnect the connection once all transactions are completed, and also inform interested parties should the connection be interrupted.

The call control entity 218 follows the mandatory recommendations of GSM specifications regarding call management and the call control aspects of GSM specification 04.07 and 04.08. The call control entity 218 conforms closely to GSM specification 04.08 5 regarding elementary procedures for circuit switch call control. The call control entity 218 communicates with the mobile network entity 220 as described below and the mobility management entity 216 as described above. More than one mobility management entity 216 connection may be established at the same time to allow parallel transactions. Since more than one call control entity is defined in the call management sublayer, parallel calls can be handled on different mobility management connections. Every call has a unique transaction identifier (TI), composed of the TI-value 0–6, and a TI flag which indicates whether the call is transceiver originated or transceiver terminated. By using the TI as a call identifier, up to seven outgoing and seven incoming call control calls can be handled in parallel. The call identifier is distinguished at the mobility management entity 216 level by having a different protocol descriptor (PD) to the same call identifier which could, for example, be used simultaneously by the supplementary services entity 226.

The call control entity 218 is wholly concerned with the stepwise progress through the different call control states for the call, as defined in GSM specifications 04.08, Chapter 5. The call control entity 218 contains the necessary error handling and management of timers to insure the correct progress through the states. In most states, not including the idle and active states, a timer insures that the call control entity 218 remains in that state for a maximum period of time. These timers are described in GSM specifications 04.08. When a timer expires, the actions described in GSM specification 04.08 are carried out. Any call specific information, for example, bearer capabilities is handled and stored in the mobile network entity 220 described below.

Call establishment is controlled as follows. Before call establishment can be initiated, the peer-to-peer connection between the mobility management entity 216 sublayers in the transceiver and in the GSM network (mobile network connection) must be established. Call establishment is initiated on the receipt of the SETUP REQ PRIMITIVE from the mobile network entity 220 for a mobile originated call, or the Est Ind primitive for the mobility management entity 216 for a mobile terminated call. The Est Ind primitive contains the SETUP message for the network. Each call is then handled using a state machine approach, with independent states stored for each call in an array of CCSTATES. The call establishment procedures are documented thoroughly in GSM specifications 04.08 7.3.2 (MOCE) and 7.3.3 (MTCE).

Call information is processed as follows. Call information messages are either call modification messages or user modification messages. Call modification is used to request a change in bearer capability during a call, for example, to switch between speech and facsimile during a call. Note that this must have been previously indicated during the setup of a call in question. A successful modification is indicated by the receipt of MODIFY COMPLETE, and a failure by the receipt of MODIFY REJECT primitive. The call control state changes accordingly and the message is relayed to the mobile network entity 220. For this case, when the MODIFY has been sent by the network, the call control 218 entity decides whether the modification is acceptable with respect to the current state. If it is allowed, then the MODIFY IND is passed up to the mobile network entity 220 where a decision on whether the contents of the new bearer capability are acceptable. User information messages are simply relayed by the call control entity 218. Received messages are passed up to the user interface 204 via the mobile network entity 220 and messages from the mobile network entity are sent onto the network via the mobility management entity 216.

Call clearing is performed as follows. The call clearing process is different depending on whether it is transceiver initiated or transceiver terminated. The network initiates call clearing by sending a disconnect message to the transceiver. The transceiver answers by sending a release message and the network concludes the procedure by sending a RELEASE COMPLETE message. In the event of a disconnect message containing a PROGRESS INDICATOR saying that in-band information is available, then instead of sending a RELEASE, the transceiver enters a state which waits for the user to terminate the call with a Release Request. In practice, this can be used, for example, to allow the network to clear a call, and pass information to the transceiver explaining why the call was cleared (e.g. SIM cash limit exceeded). If the call was the last active call in the traffic channel, then the traffic channel was no longer needed and the mobility management entity 216 will perform a channel release. A tranceiver initiated disconnect occurs as a result of a Disconnect Request primitive, originally sent by the user interface. A disconnect message is sent to the network, which then responds by sending a release message to which the mobile answers by sending a Release Complete and returning this call to the idle state. When the Release or Release Complete message is received from the network, depending upon whether the call is released from the mobile or the network, a release indication is passed onto the mobile network entity 220, which then frees the corresponding transaction identifier and releases any memory or state information which relates to the call.

The call control entity 218 performs handling of miscellaneous messages. The miscellaneous messages are DTMF, Status, Notify, Congestion and Control Messages. The DTMF messages are used by the mobility management DTMF state machine for the purposes of handling DTMF for a particular call. All of the information regarding the DTMF control and timing is handled by the mobile network entity 220. The status and status inquiry messages provide a mechanism whereby the peer control entities in the transceiver and the network and inquire of each other the current status at any time. The status information contains the cause and call state for the particular call. This is used to allow the network to check for test purposes that the call control entity of the transceiver is in the expected state. The call control entity 218 responds to the Status Inquire by sending the Status message to the network. The Notify message is used to send information from the network to the transceiver or vice versa to indicate the information pertaining to the call, such as user suspended. A received Notify message is simply passed on to the mobile network entity 220.

The mobile network entity 220 follows the requirements of the GSM specifications and, in particular, the call management aspects of GSM specifications 04.07 and 04.08 as well as the supplementary services recommendations in 04.8x. The mobile network entity 220 lies between the user interface 204 and the call control entity 218. The mobile network entity provides services to the user interface 204 in a more easily usable form than if the user interface were to communicate directly with the call control entity 218. In addition, it takes over the management of the call control entity 218 in many cases where the user interface 204 would otherwise be responsible. There are some facilities, such as tone generation, which must be accessed by the GSM protocol stack, as well as by the user interface 204. To provide a common interface to these, the mobile network entity 220 includes managers for such features. The call control entity 218 is completely shielded from the hardware capabilities. Only the mobile network entity 220 interacts with the hardware. In summary, the mobile network entity reduces the GSM responsibilities of the user interface to a minimum, and many facilities which need to be accessed by both the GSM protocol stack and the user interface can be accessed through the common procedures in the mobile network entity 220.

The mobile network entity 220 contains a tone generation manager, a transaction identifier manager, a traffic channel manager, a service manager, a special information element manager and a DTMF manager, which are described as follows.

The tone generation manager provides the capability of driving up to sixteen speakers simultaneously with each speaker being capable of being individually controlled. The tone characteristics can be modified at run time for each tone on each speaker. Crescendo levels can also be set for each tone.

The transaction identifier manager performs the following functions. A transaction corresponds to a single call. Since the protocol stack must manage multiple calls, for example, during multi-party calls, it is necessary to manage multiple transaction identifiers. Up to seven originated calls can be managed simultaneously.

The traffic channel manager handles the communications with a device driver for a CODEC in the hardware.

The graphic channel manager maintains information about the current status of the traffic channel, for example, whether only signalling is allowed, or full or half-speech is being used. It informs the driver when it can switch to or from the traffic channel, when it should start sending traffic, and in which mode it should start.

The service manager handles the unique identification of bearer capabilities for the transceiver. The user interface must register the full set of bearer capabilities which are supported by the transceiver. The service manager will return a service identifier for each registered service. The user interface 204 then can uniquely identify the required service for outgoing calls. Similarly, for outgoing calls, the mobile network entity 220 can decide if the service is supported, and if so, it then informs the user interface 204 giving only the service identifier, instead of the complex bearer capability information sent from the network. Should the network request a call with an unsupported bearer capability, then the mobile network entity 220 will either refuse the call, or negotiate the call. Negotiation might involve saying that the service can be supported but at a lower baud rate. Bearer capabilities can be registered and de-registered during run-time, which would be necessary if, for example, an external facsimile machine were to be connected or disconnected while the mobile is switched on.

The special information element manager performs the following functions. Some information elements which would otherwise have to be serviced by the user interface 204, are evaluated within the mobile network entity 220 and the essential information is then passed to the user interface 204 in an easy to use form. Information elements, such as progress indications, facility information and calling party number are handled here.

The DTMF manager performs the following functions. The DTMF manager handles any signalling and timing required in order to implement the DTMF functionality in the transceiver.

In addition, the mobile network entity 220 contains a unit for handling mobile network specific timers, and interfaces the test entity 222 as described below to the corresponding device driver functions (speech decoder/encoder, DSP functions).

The test entity 222 implements the GSM type approval test functions specified in GSM specification 11.10. The TCH-LOOP test and the Digital Audio Interface Tests are fully supported. The test features are only available when a test SIM is being used as described below. The test entity 222 contains diverse data structures. The test entity is initialized by setting all variables to the off state a number of variables are static to the entity.

There are three entity state variables within the test entity 222. These variables indicate the TCH state, the EMMI state and the mode of operation of the digital signal processor of the hardware 202 (i.e. loop back or not). The TCH state has three stable states, Tch None Tch Open and Tch Close, which are part of the data structures. The TCH state is stored in the TETch State variable. When the state is changing between open and closed, intermediate states are used to prevent any actions occurring until the changeover is complete. Messages which arrive during a changeover are delayed until the changeover is complete. The loop back proceeds as follows. First, the mobile network entity 220 switches out uplink traffic then the DSP is switched into loop back mode. Opening of the loop back requires that the procedure is performed in reverse. First, the DSP loop back is removed, then the mobile network accepts uplink traffic again.

The SIM entity 224 follows GSM specifications 11.11. The SIM entity 224 can be on or off.

The supplemental services entity 226 provides all aspects of the protocol required for the user to control call forwarding. The supported operations are a registration of call forwarding, erasure of call forwarding and interrogation of call forwarding. The supplementary services entity 226 also provides all of the aspects of the protocol required for the user to control call barring. The supported operations are activation of call barring, deactivation of call barring, interrogation of call barring and password registration.

The SMS entity 228 controls the sending, receiving and storage of Short Messages for Point to Point short message exchange. It also controls the reception and temporary storage of the Cell Broadcast SMS. These two services can be defined as follows:

Point To Point SMS: This service allows a user to send a short text (max length 160 characters) from a transceiver to another transceiver. The message is sent in store and forward mode. That is to say that no connection is established between the two transceivers, but rather the message is sent from the originating transceiver to a service center. The service center then attempts to forward the message to the destination. If it is successful, then the message is deleted in the service center. If the destination transceiver cannot be reached, then the service center stores the message and continues to attempt to forward the message at periodic intervals. The originating transceiver can specify the length of time for which the message should be stored in the service center before deleting the message.

Cell Broadcast: This service is used by the network to broadcast short messages to transceivers. The transceiver cannot reply. This service is typically used in order to broadcast advertising, weather reports and such like. It is very similar in operation to the teletext services found on most television channels today.

The SMS entity 228 conforms to mandatory aspects of GSM Recommendations 03.40 v. 4.9.1, 04.11 v. 4.7.0 for Point-to-Point, and 03.41 v. 4.9.0 and 04.12 v. 4.4.0 for Cell Broadcast.

Additionally, interfaces exist between the various entities which perform overall functions consistent with the functionality of the multilayer protocol stack 200 specified by the GSM specifications.

The operation of a GSM transceiver requires channel establishment between the transceiver and the network in accordance with the GSM protocol. The radio resources 214 entity and the mobility management entity 216 of the prior art of FIG. 3 interact to control channel establishment. GSM specifications 04.07 suggest an overall organization of the GSM protocol stack 200 in which entities are responsible for performing parts of the signalling protocol between the transceivers and base stations of the GSM communication system. These entities communicate internally by passing messages or "primitives" between themselves. Each entity is assumed to sequentially pass only one primitive at a time. All entities are assumed to operate independently of and parallel to each other. The precedents of relationships between the entities specified by GSM specifications 04.07 is important because it corresponds to the priority of messages which are exchanged between a transceiver and a base station. GSM specifications 04.08 specify in detail the signalling protocol used between the transceivers and the base stations of the GSM network.

A traditional method of monitoring and debugging of software involves the programmer inserting print statements into the code that at appropriate times allows monitoring of critical values manipulated by the software and to observe the flow of control within the program.

This method is probably the oldest method for monitoring and debugging of software. With careful choices of what is monitored, it can be as effective as state of the art source code debugging systems. This arises from the fact that printed messages and values can be made meaningful to the observer. A source code debugger shows anonymous positions in a program and allows arbitrary variables to be inspected, without any indication of what is important. As a result, source code debuggers are inadequate for monitoring and debugging complex applications programs such as the protocol stack of a GSM transceiver.

Although state of the art in-circuit emulators allow source code debugging in prototypes of embedded systems, such as GSM transceivers, it is rare to have this luxury in a final product, especially where weight and size are a premium. Unfortunately, the complexity of some state of the art communication and data processing systems is such that it is impossible to fully debug the software until it is well past the prototype stage, and under conditions that it is impossible to subject a prototype to an in-circuit emulator. A good example of such a system is a digital telephone such as the GSM transceiver described above. As can be seen from the description of the protocol stack of a prior art GSM transceiver, as illustrated in FIGS. 2 and 3 and described above, a high degree of complexity is involved in the execution of the modules of the protocol stack which make it difficult to debug and trace operation of the application programs therein.

Most modern microcontrollers used for embedded systems, such as state of the art communication devices, such as GSM transceivers as illustrated in FIG. 1 and described above, have serial communications ports which allow the programmer to insert print statements into the code and monitoring of the activity of the software over the serial port. There are several problems with this approach for monitoring and debugging application programs:

1. The text components of the messages must be stored within the embedded system, requiring large amounts of additional memory.

2. The formatting activity associated with the conversion of stored values to text that is easily understood by humans presents a considerable processing load on the microcontroller.

3. The data rate that is possible with inexpensive serial communications ports severely limits the number of points within a program that can be reasonably monitored and debugged.

U.S. Pat. No. 5,297,274 discloses concurrently running, thread generating breakpoint interrupts to an active tracing monitor. A trace function is used to insert a running thread program into the selected application which continuously generates breakpoint interrupts on a periodic basis. Stored indications of the application's state are then used to generate a report.

U.S. Pat. No. 3,707,725 describes improvements in tracing the execution of a program. A tracing program copies into a traced program instructions to be executed and traced that are kept subservient to the tracing program. The tracing program controls the computer of the traced program. The tracing program is quiescent when not tracing.

U.S. Pat. No. 4,802,165 discloses a method and apparatus for debugging computer programs. Macros are used that can be called on to expand into operable code and are inserted into the program at various locations. The macros are programmer-selectable. Symbol table code 14 allows the expanded macros to determine whether tracing has been enabled for a particular symbol. The symbol table code 14 also allows for statistics to be kept for each symbol.

U.S. Pat. No. 5,347,649 describes a system for dynamically generating, correlating, and reading multiprocessing trace data in a shared memory. In the operation of a multi-processing system a problem in one data processing function may be caused by a problem in a different data processing function. Simultaneously tracing the two functions and time correlating trace data allow problem identification.

U.S. Pat. No. 5,121,489 discloses a tracing method for identifying program execution paths using a trace points bit map with one-to-one correspondence with embedded trace points. In this system bit maps are initialized to a known state at the beginning of execution and transferred at the end of execution such that tracing is continuous. Tracing capability is embedded in a target program by inputting the instructions for the steps of the tracing method into the target program.

The software system debugger of U.S. Pat. No. 5,394,544 uses distinct interrupt vector maps for debugging and application programs. A separate OS-free debugging unit includes a communication channel 14 and a target processor unit. Communication channel 14 is serial such as an RS232 link.

U.S. Pat. No. 5,127,103, discloses a real-time tracing of dynamic local data in high level languages in the presence of process context switches. The system includes a host processor 103, a debugger control processor 111, and a global tag table memory 113.

DISCLOSURE OF INVENTION

The present invention is a method tracing execution of computer programs in data processing systems and provides improved monitoring and tracing of the execution of computer (application) programs in data processing systems such as, but not limited to, GSM transceivers. The present invention is a modification of the known use of print statements for tracing and monitoring execution of computer programs which lessens the processing overhead on the data processing system in tracing program execution than in the prior art by offloading some of the processing overhead to a host processor. The invention provides the programmer with the ability to examine the execution of a selected part of a computer program of the data processing system and further permits determination in the execution of that selected part if certain variables have particular values in which the programmer is interested.

The present invention provides a tracing capability of application programs in microprocessor based systems having a data port, which typically is the serial port, which has a limited throughput capability. With the invention, the overhead associated with the generation of print statements in the prior art for purposes of debugging and monitoring execution of computer programs is lessened by the use of a host processor system which stores diagnostic trace data, such as print statements, and further performs associated formatting and output which is typically a display of trace information for enabling tracing of execution of selected parts of the computer program of the data processing system. A preferred form of host processing system is a laptop or palmtop computer which is connected by a communications link to the data processing whose computer program is being traced, such as, but not limited to through a serial port. This configuration allows monitoring of almost all types of data processing systems, such as embedded systems utilized in communications as typified by GSM transceivers which have highly complex and voluminous computer programs, as described above with reference to the prior art, which require monitoring and debugging which is facilitated by tracing the execution of the selected parts of the computer programs.

In accordance with the invention, a limited quantity of trace information is processed by the data processing system and is transmitted to the host processor during tracing of execution of selected parts of a computer program which lessens the overhead on the data processing system from the overhead associated with traditional print statement methods of tracing of computer program execution. The trace information transmitted from the data processing system over a communications link to the host system, which is limited in quantity to avoid excessive overhead on the processing capability of the data processing system, is typified by a numerical index identifying a trace message and parameters of the trace message. The trace information from the data processing system is processed by the host system in association with additional information received by the host processor from a trace definition file, as described below, to generate an output for enabling tracing of the execution of selected parts of the computer program.

The present invention provides selective identification of the trace information which is transmitted from the data processing system to the host system which is important to enable the person performing tracing to concentrate on execution of selected areas of the application programs. This is particularly important in large data processing systems, such as GSM transceivers, where the system computer programs are the product of many programmers.

The invention provides coordination between the data processing system and the host processing system to permit a meaningful output form the host processor for enabling tracing of the execution of selected parts of the computer program under the control of the host processor. The host processor processes the trace information received from the data processor for the observer's benefit to provide necessary information to present a consistent view of the behavior and execution of the computer programs of the embedded system. The coordination is achieved between the data processing system and the host processor by the use of a macro pre-processor in which print statements are specified by the programmer.

The trace definition file contains a plurality of trace definitions which provide information including trace messages to be used in the tracing of execution of the computer programs of the data processing system. Each trace definition contains a symbolic identity or a numerical index of each trace message to be outputted by the host processor. The use of symbolic identities is more useful because they are recognized by the observer as a result of their content, such as a descriptive word. Additionally, each trace definition contains a specification of the format of the trace message to be outputted by the host processor preferably as a display. Finally, each trace definition includes a specification of parameters of the print message. In some programming languages, such as the "C" programming language, the format specification may be sufficient to implicitly describe the parameter types but, in other languages, the specification of parameters is necessary.

Optionally, each trace definition of the trace definition file may contain further attributes, such as a style of a trace message, which may be a special text, such as a word "error" which specify stylistic features which are attributes of the diagnostic trace data.

A class of trace message may be used to control if a group of trace messages is to be sent from the data processing system to the host processor. Because a large quantity of trace information is potentially generated in the data processing system in relation to the throughput of the data link between the data processing system and the host processor used for tracing, selective control of trace information which is transmitted from the data processing system to the host processor is necessary. In this circumstance, groups of trace information representing plural trace messages are controlled as individual entities.

The trace definition file is processed with a trace definition compiler to produce embedded data processing system information utilized by the data processing system during execution of the computer program which is being traced for generating the transmission of selected trace information from the data processor to the host processor over the communications link which does not apply substantial processing overhead to the operation of the processor of the data processing system and host processor trace information which is utilized by the host processor to send an identification of selected parts of the computer program to be traced over the communications link to the host processor during execution of the computer program by the data processing system and further to process the trace information received from the data processing system over the communications link during execution of the application program to produce a corresponding output, which is typically a textual statement (trace message), for enabling tracing of the execution of selected parts of the computer program. The host trace system information, which is produced by the trace definition compiler from the input of the trace definition file, is a binary data file containing all of the trace definitions as compiled by the trace definition compiler.

The trace definition compiler produces for each trace definition three files.

The first file produced by the trace definition compiler for each trace definition contains macro definitions which the programmer may call from within the application program being traced. Each macro corresponds to a desired print message. Each macro definition takes as arguments the parameters of the corresponding print message and generates a call function with arguments corresponding to the parameters of the print message, together with a numerical index that uniquely identifies the print message which permits its identification from within the large number of print messages which are typically present in the trace definition file. The macro definition is used to identify the print message and its parameters to be used by the host processor.

Each macro has two functions. The first function is to allow the programmer to assign a symbolic name to the corresponding numerical index identifying the print message. While this is not a necessity and programmers may manually assign numerical indices to identify each print message, it should be noted that manual assignment becomes unmanageable in large data processing systems, such as a GSM transceiver, in which hundreds or thousands of print messages may be contained in the trace definition file. The second function of the macro is to hide the details of the function being called so that, in languages which allow functions with variable numbers of arguments, the same function can be provided for all macros. If the programming language does not allow variable numbers of arguments, a function which is called must be one that takes only the arguments for the print message together with its associated numerical index.

A macro preprocessor may be used by the present invention that does not limit the application of the present invention to programming languages, such as the "C" programming language, in which a macro pass is always performed. Other languages in which the present invention may be practiced may use general purpose macro processors for this purpose.

The second file prepared by the trace definition compiler for each trace definition contains necessary tabular information or function definitions permitting the numerical index of the print message, together with parameters, to be transferred from the data processing system over the communications link to the host processor. In languages allowing functions with variable numbers of parameters, a single common routine may be used but it will require tabular information to determine from the numerical index how much and in what format the parameter data must be transferred. In languages where variable numbers of parameters are permitted, the source code of the function must be generated for each pattern of parameters specified in the trace definition file. These functions or tables are then used by the data processing system to transfer the necessary trace information from the data processing system across the communications link to the host computer in accordance with either a serial or parallel data transmitting protocol without overloading the transmission capacity of the communications link.

Finally, the third file produced by the trace definition compiler contains for each trace definition a table entry relating the numerical index of the trace definition to the corresponding format of the print message together with any other information necessary to produce a final output such as a text display of the print message with a specified style of message. The third file is used by the host processor to preferably produce a final textual output from the combination of the numerical index and parameter values transmitted from the data processing system across the communications link to the host processor which lessens processing and overhead and the quantity of information to be transmitted by the communications link.

The data processing system recompiles the information produced by the trace definition compiler using the header files provided by the trace definition compiler. The header files in a preferred embodiment contain "C" macros which correspond to the definitions of each print message in the trace definition file. After the recompiling by the data processing system using the header files, a trace control table is produced which is a data file preferably in the "C" programming language which is compiled into the data processing system application program to provide the application program of the embedded data processing system with definitions of parameters used with each print message.

The host processor, when tracing of the computer program of the data processing system is initiated, reads the complete binary data file prepared by the trace definition compiler which contains all of the trace definitions and sends an identification of any selected parts of the computer program of the data processing system to be traced over the communications link to the data processing system. Thereafter, during execution of the computer program, because the host processor has access to the complete compiled trace definition file, the host processor is able to provide appropriate outputs of print messages enabling tracing in response to the transmission of tracing information outputted during execution of the selected parts of the computer program from the data processor over the communications link to the host processor which occurs in response to the host processor's aforementioned communication across the communication link to the data processing system of an identification of selected parts of the computer program to be traced which have already been compiled and stored in memory by the data processing system in response to receipt of the compiled trace definition file. As a result, the overhead of outputting of trace information for enabling tracing of execution of the selected parts of the computer program is shifted from the data processing system in accordance with the prior art to the host processor which permits the embedding of the print messages in the compiled application program without burdening the operational capacity of the processor of the data processing system or the transmission capacity of the communications link. The reduction in the quantity of trace information transmitted from the data processing system to the host processing system over the communications link, in response to the host processor communicating with the data processing system to identify selected parts of the computer program to be traced, permits operation of the communications link at a low bandwidth which typifies the capacity of serial links of microprocessors used in communications products, such as a GSM transceiver. Accordingly, the programmer is provided complete access to trace the totality of or selected parts of computer programs and the host processor removes processing overhead from the data processing system whose program is being traced. This solves the problems of the prior art of tracing of computer programs in which the data processing system serviced the complete overhead of the tracing process.

BEST MODE FOR CARRYING OUT THE INVENTION

Figure 1:
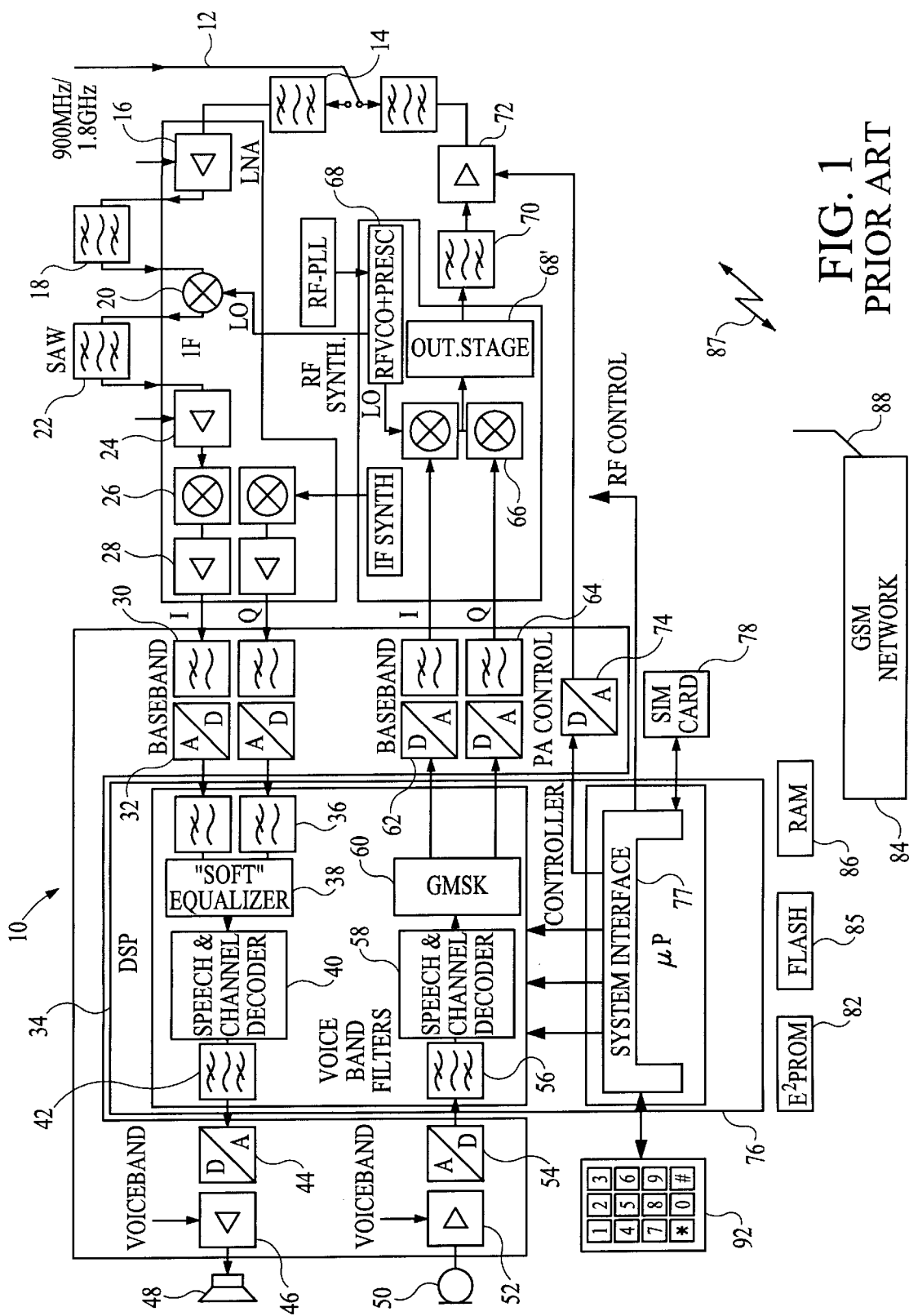
FIG. 1 is a block diagram of a GSM transceiver in accordance with the prior art.
Figure 2:
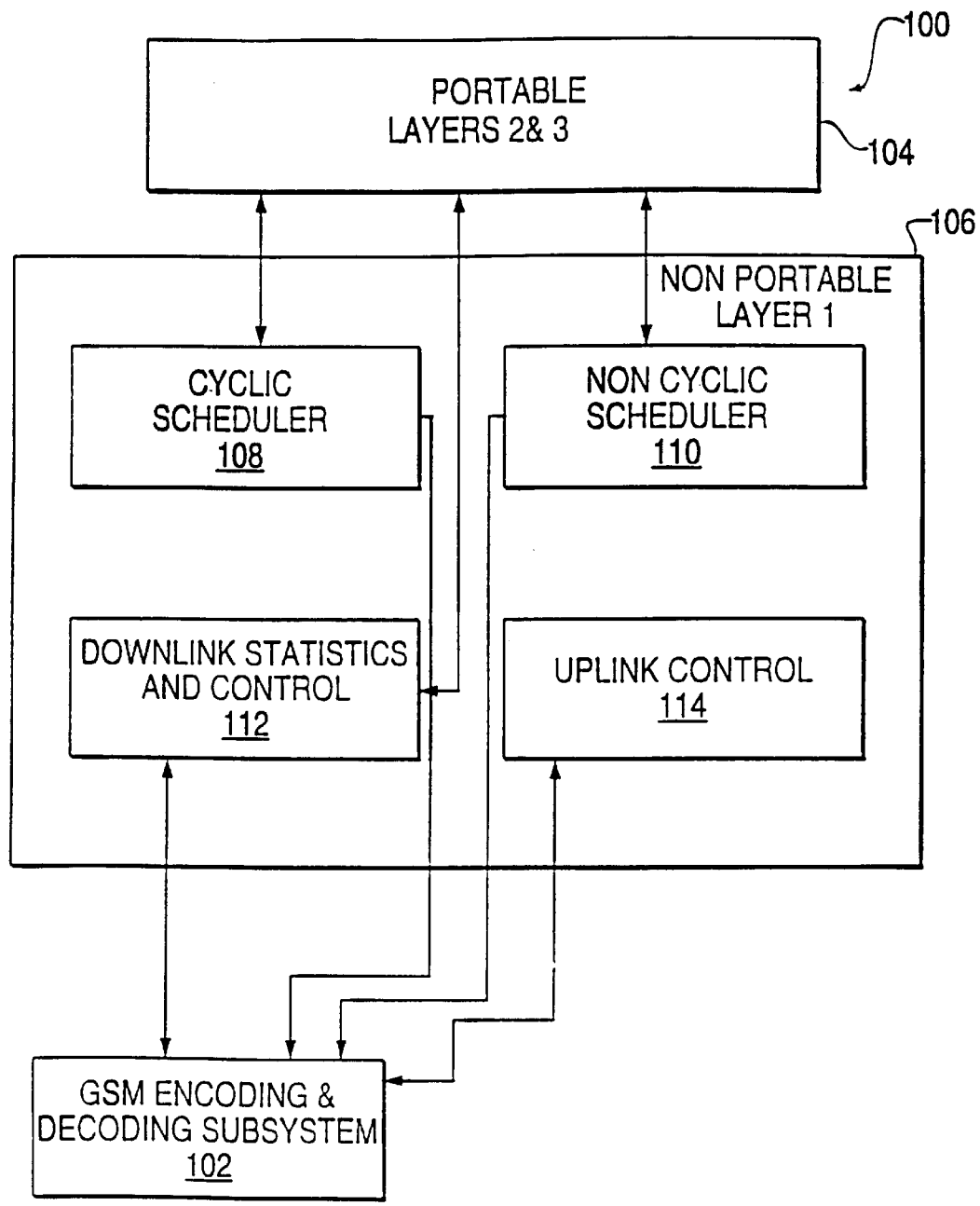
FIG. 2 is a block diagram of a prior art multilayer protocol stack as used in a GSM transceiver such as that illustrated in FIG. 1.
Figure 3:
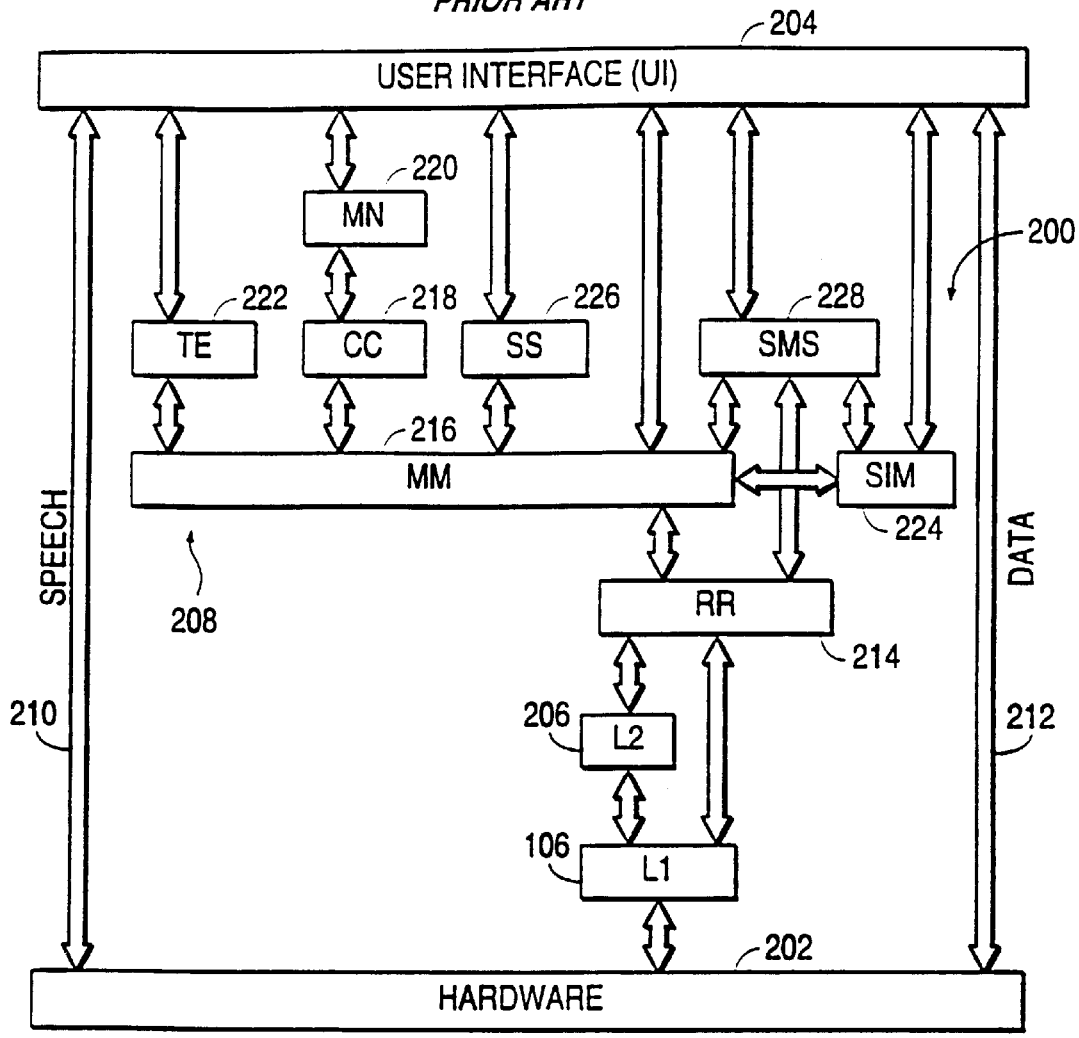
FIG. 3 is a block diagram of a publication of the assignee's prior art multilayer protocol stack illustrating the details of layer 3 as used in a GSM transceiver such as FIG. 1.
Figure 4:
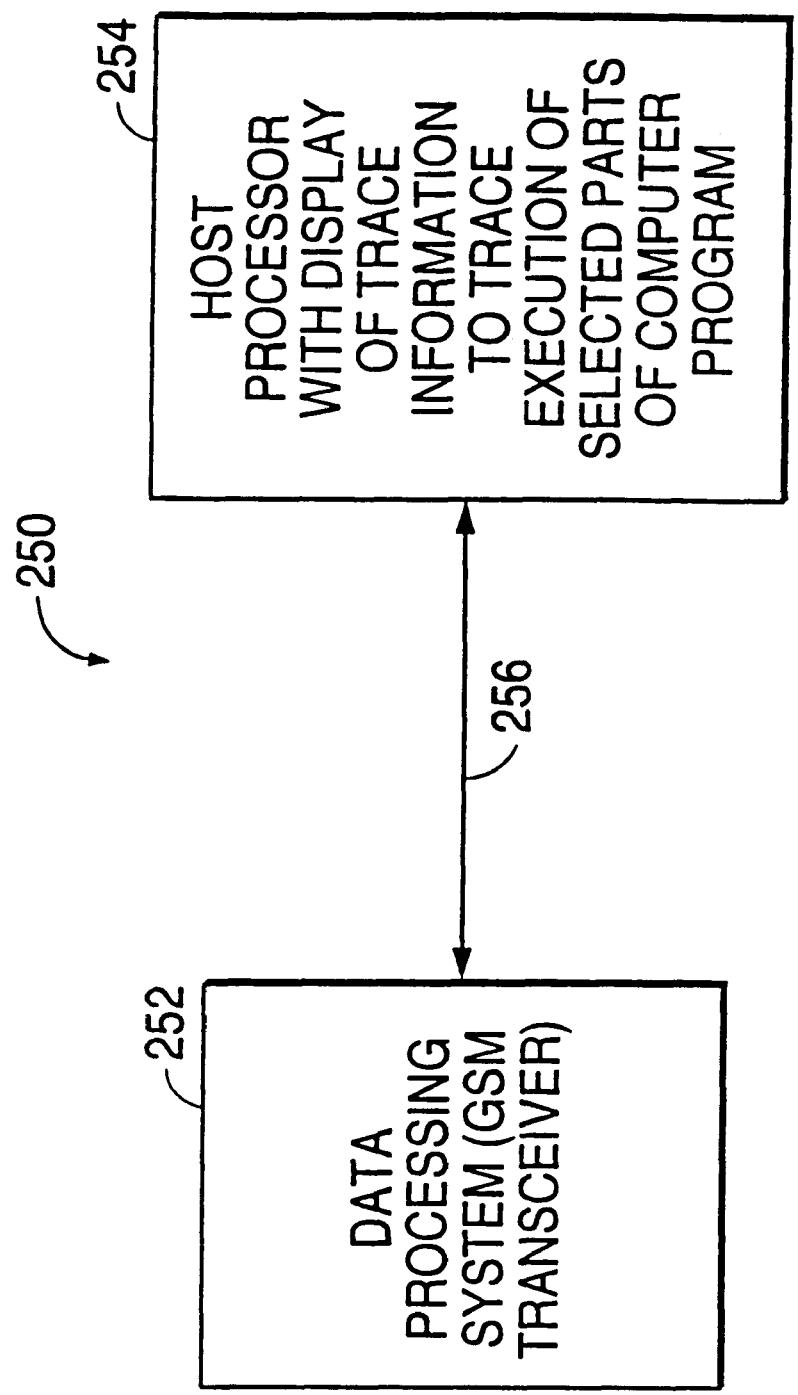
FIG. 4 is a block diagram of a data processing system and a host processor which may be used to practice the method of tracing execution of computer programs in accordance with the present invention.

FIG. 4 is a block diagram of a system 250 in which the method of tracing a computer program of a data processing system 252 in accordance with the invention may be practiced. The execution of selected parts of a computer program of the data processing system 252, such as applications programs, is performed in accordance with the present invention. In a preferred embodiment of the present invention, the data processing system 252 is connected to a host processor 254 via a communications link 256 which may be a serial or parallel link. In a preferred embodiment, the data processing system 252 has a microprocessor having a serial port which is connected to the communications link 256. The data processing system 252 in a preferred embodiment of the present invention is a GSM transceiver in accordance with the prior art of FIGS. 1–3 which is typified by complex and voluminous application programs having a multilayer protocol stack in accordance with published GSM specifications. Furthermore, the communications link 256 is typically connected to an RS232 data port of the microprocessor controlling the operation of the GSM transceiver in accordance with FIG. 1. The host processor 254 is preferably a PC or palmtop computer having substantial processing capability which permits the off loading of the overhead typified by the prior art use of print messages from the data processing system whose application program execution is being traced. The host processor 254 receives an output of trace information from the data processing system 252 over the communications link 256 and in response to selected information provided from the trace definition file 302 as described in conjunction with FIG. 5 below provides an output of print messages which preferably is a display on a monitor associated with the host processor 254 for enabling tracing of the execution of selected parts of the computer program such as the multilayer protocol stack of the prior art described above in conjunction with FIGS. 2 and 3.

It should be noted that the trace information transmitted from the data processing system 252 over the communications system to the data processor has a substantially compressed format when compared to the corresponding output of the trace messages from the host processor. The transmission of a numerical index and parameters of a print message and any additional optional information represents far less information than the print messages themselves as outputted.

Figure 5:
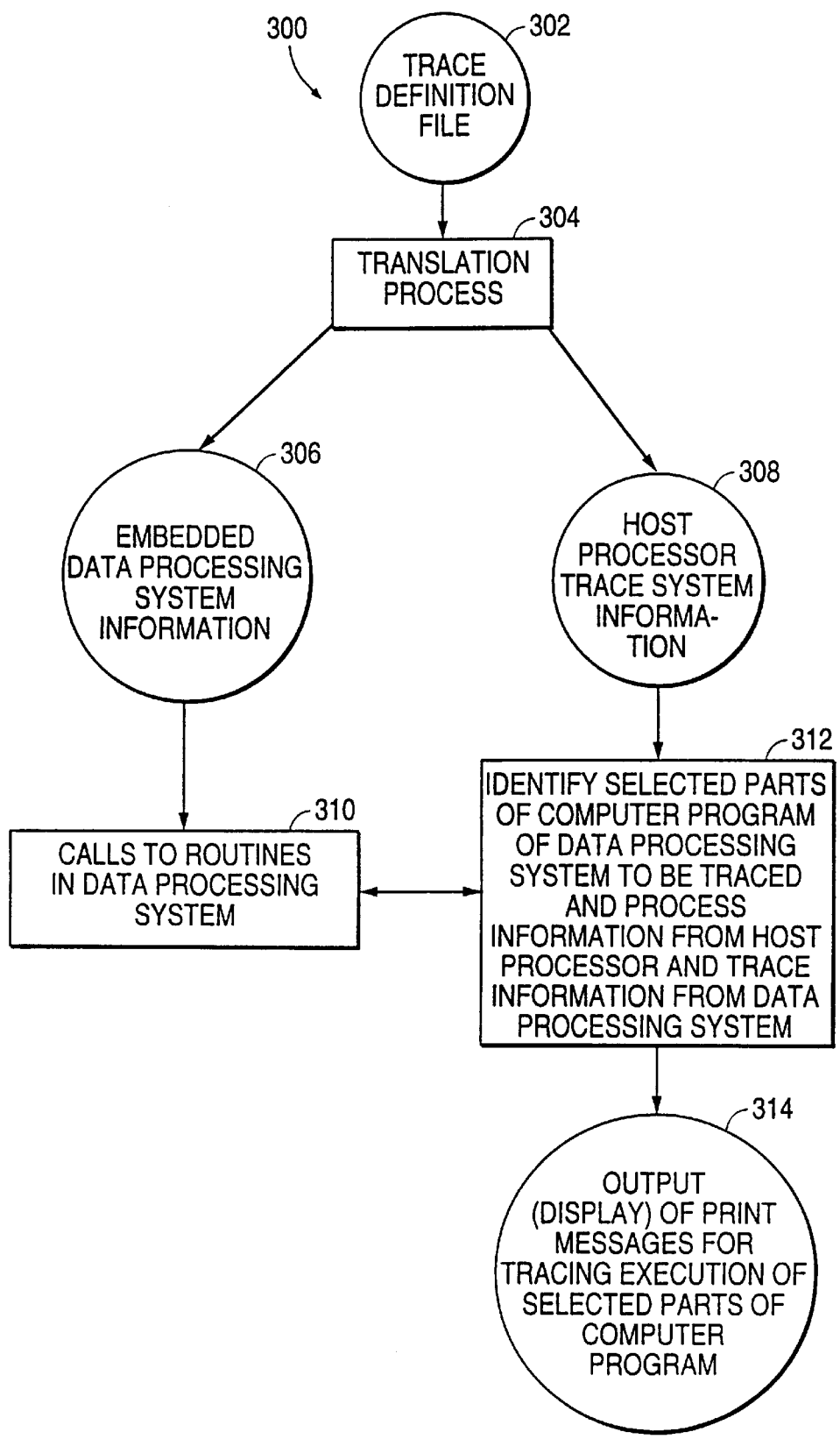
FIG. 5 is a block diagram of the method of tracing execution of computer programs in accordance with the present invention.

FIG. 5 illustrates a block diagram of the method of tracing execution of a computer program of a data processing system 252 in accordance with the present invention in association with the host processor 254 and the communications link 256 of FIG. 4.

The method 300 of tracing execution of computer programs of a data processing system 252 begins with the preparation of a trace definition file 302 which contains definitions of individual print messages which are used for tracing and are outputted by the host processor 254. Each trace definition contains the content of the print statement, a symbolic identity or a numerical index of a print message, a specification of the format of the print messages to be displayed, and a specification of types of parameters of the print message which, depending upon the programming language being used, such as the "C" programming language, may be unnecessary if the language permits implicit description of parameter types. The use of the symbolic identity is preferred, which is processed by the translation process 304, to provide a unique numerical index in the embedded data processing system information 316 described below of each trace definition. optionally, each print message may contain a style of print message, such as special text, e.g. "error", for specifying stylistic features, such as an attribute of the print message and a class of print messages to control if certain groups of print messages are to be sent from the data processing system 252 to the host processor 254 which is important when the number of print messages in the host processor is large in relation to the transmission capacity of the data processing link 256 which makes control of the quantity of information transmitted over the communications link necessary.

The translation process 304 functions as a trace definition compiler which compiles the trace definition file 302 into the embedded data processing system information file 306 and the host processor trace system information file 308.

The embedded data processing system information 306 produced for the data processing system 252 is a set of "C" language header files which contain macro definitions for the individual print message as defined in the trace definition file 302.

The binary data file of the host processor trace system information 308 is read by the trace host program at the time tracing by the host processor 254 is started.

At the time that it is desired to trace the execution of selected parts of the computer program of the data processing system 252, the host processor 254 identifies the selected parts of the computer program of the data processing 252 to be traced and transmits an identification thereof to the data processing system 252 over the communications link 256 which results in the data processing system calling routines as identified by reference numeral 310. As a result of execution of the computer program, trace information associated with the execution of selected parts of the computer program is transmitted from the data processing system over the communications link 256 to the host processor 254. The trace information comprises the encoded identification of each print message and parameters of the print message. Optionally, depending upon the type of programming language utilized by the data processing system 252, a specification of the types of parameters of the print message is further provided where the programming language format specification is not sufficient to implicitly describe the parameter types. After the host processor 254 communicates with the data processing system 252 to identify selected parts of the computer program to be traced and the execution thereof starts, trace information is transmitted from the data processor 252 to the host processor 254 over the communications link 256 as described above and the host processor in response to the transmission of the trace information from the data processing system and in response to the host processor trace system information 308, causes an output of the print messages for enabling tracing of the execution of the selected parts of the computer program as illustrated in 314 in accordance with the code example given below. A preferred output is a display on a monitor of the host processing system which may be a PC or other computer system.

An example of a trace definition in the trace definition file 302 and an extract from the resulting trace header file is as follows:

1) An extraction is made from trace definition file 302 for the mobility management entity 216 of FIG. 3 of a GSM transceiver, containing a definition for a print message with the trace name, trace class, the string which is to be generated for this trace, the parameters which are required by this trace and the name of the string lookup table from which the parameter values are to be printed, i.e., the textual representations of the two %s parameters are found in the string table for the digital signal processor states of the mobile network entity 220 (MNDSPSTATES). The transceiver will only transfer the integer value of the DSP (FIG. 1) state which will then be looked up in the string table and will be displayed in text form as follows.

info MNTraceAttachToTCH MNTraceTCh "MN TCH attaching to TCh: state %s→%s" MNDSPStates, MNDSPStates 2) An extraction is made from the trace header file MNTrace.h, which is generated by the trace compiler of the translation process 302. This file contains "C" language macro definitions corresponding to the trace given above. The contents of this macro is a call to GSMExternalTrace with the trade id which has been assigned to the trace along with the two parameters taken from the trace definition.

define   MNTraceAttachToTCH(P1,P2) GSMExternalTrace(7292,P1,P2)

The number 7292 is the numerical identification of the trace message and P1 and P2 are parameters.

3) An example of a trace call within the body of the program is as follows. The program wishes to trace that the transceiver has just camped on a traffic channel, and wishes to trace the old and new states of the DSP of FIG. 1.

MNTraceAttachToTCH (OldDSPState, NewDSPState);

4) GSMExternalTrace must look up the trace given in trace control tables of the embedded data processing system information 306 so it knows how many parameters the trace message requires and what the data types of the parameters are. These internal trace tables are supplied by the trace compiler of the translation process 304 as part of the compiler output and are compiled into the transceiver memory as data files. Having found the appropriate information, the parameters are then copied from the parameter stack and are packed into a message along the trace id, 7292 in this case. The packed message is then transmitted to the host program and processed in accordance with step 312.

The host processor trace information 308 produced for the host system is a file of binary data which contains all the strings declared in the trace definition files 302, along with trace control data similar to the trace control data supplied to the transceiver which allows the host processor program to look up the trace id and then correctly unpack the trace message and display the trace string and its parameters in the way defined in the trace control file at step 314. In the example above, this results in the following trace output being generated at step 314:

MN TCH attaching to TCh: state DSPSpeechLoaded→DSPSpeechActive

As a result of sharing of the overhead of tracing the execution of selected parts of a computer program of a data processing system with a host processor, the data processing systems of devices, such as GSM transceivers, may have their programs traced without burdening their data processing capacity as typified by prior art usages of print messages.

While a preferred embodiment of the present invention is the tracing of the operation of a data processing system of a GSM transceiver, it should be understood that the invention is not limited thereto. It is intended that all such modifications fall within the scope of the appended claims.

I claim:

1. A method of tracing execution of computer programs of a data processing system with print messages comprising:

providing a trace definition file containing a plurality of trace definitions, each trace definition containing a content of each print message to be used with the tracing of execution of a computer program of the data processing system, an encoded identification of each print message and a format specification of an output for providing a trace of the execution of the computer program;

providing information from the trace definition file to the data processing system which is executed with the computer program;

providing information from the trace definition file to a host processor;

the host processor communicating with the data processing system to identify selected parts of the computer program to be traced;

in response to execution of the computer program transmitting trace information from the data processing system to the host processor associated with the selected parts of the computer program being traced; and the host processor, in response to transmission of the trace information from the data processing system and in response to the information provided from the trace definition file, causing the output for enabling tracing of the execution of the selected parts of the computer program.

2. A method in accordance with claim 1 wherein:

the output is displayed; and the selected information provided from the trace definition file to the data processing system executed with the computer program and from the data processing system to the host processor comprises the encoded identification of each trace definition.

3. A method in accordance with claim 2 wherein:

the trace definition file further includes parameters of the trace information; and the selected information provided from the trace definition file to the data processing system which is executed with the computer program and from the data processing system to the host processor further comprises the parameters of the trace information.

4. A method in accordance with claim 1 wherein:

the encoded identification of each trace definition is a unique numerical identification thereof.

5. A method of tracing execution of computer programs of a data processing system with print messages comprising:

providing a trace definition file containing a plurality of trace definitions, each trace definition containing an encoded identification of each print message to be used with the tracing of execution of a computer program of the data processing system and a format specification of an output for providing a trace of the execution of the computer program;

providing information from the trace definition file to the data processing system which is executed with the computer program;

providing information from the trace definition file to a host processor;

the host processor communicating with the data processing system to identify selected parts of the computer program to be traced;

in response to execution of the computer program transmitting trace information from the data processing system to the host processor associated with the selected parts of the computer program being traced; and the host processor, in response to transmission of the trace information from the data processing system and in response to the information provided from the trace definition file causing the output for enabling tracing of the execution of the selected parts of the computer program; and wherein the encoded identification of each trace definition is a unique symbolic identity thereof; and each unique symbolic identity is converted to a unique numerical identification thereof which is compiled as part of the computer program.

6. A method in accordance with claim 5 wherein:

the output is displayed; and the selected information provided from the trace definition file to the data processing system executed with the computer program and from the data processing system to the host processor comprises the encoded identification of each trace definition.

7. A method in accordance with claim 6 wherein:

the trace definition file further includes parameters of the trace information; and the selected information provided from the trace definition file to the data processing system which is executed with the computer program and from the data processing system to the host processor further comprises the parameters of the trace information.

8. A method in accordance with claim 7 wherein:

the data processing system is a GSM transceiver.

9. A method in accordance with claim 8 wherein:

the trace definition file is compiled to generate the selected information provided to the data processing system and the host processor.

10. A method in accordance with claim 6 wherein:

the data processing system is a GSM transceiver.

11. A method in accordance with claim 10 wherein:

the trace definition file is compiled to generate the selected information provided to the data processing system and the host processor.

12. A method in accordance with claim 6 wherein:

the trace definition file is compiled to generate the selected information provided to the data processing system and the host processor.

13. A method in accordance with claim 7 wherein:

the trace definition file is compiled to generate the selected information provided to the data processing system and the host processor.

14. A method in accordance with claim 5 wherein:

the encoded identification of each trace definition is a unique numerical identification thereof.

15. A method in accordance with claim 14 wherein:

the data processing system is a GSM transceiver.

16. A method in accordance with claim 15 wherein:

the trace definition file is compiled to generate the selected information provided to the data processing system and the host processor.

17. A method in accordance with claim 14 wherein:

the trace definition file is compiled to generate the selected information provided to the data processing system and the host processor.

18. A method in accordance with claim 5 wherein:

the data processing system is a GSM transceiver.

19. A method in accordance with claim 18 wherein:

the trace definition file is compiled to generate the selected information provided to the data processing system and the host processor.

20. A method in accordance with claim 5 wherein:

the trace definition file is compiled to generate the selected information provided to the data processing system and the host processor.

21. A method of tracing execution of computer programs of a GSM receiver with print messages comprising:

providing a trace definition file containing a plurality of trace definitions, each trace definition containing an encoded identification of each print message to be used with the tracing of execution of a computer program of the GSM receiver and a format specification of an output for providing a trace of the execution of the computer program;

providing information from the trace definition file to the GSM receiver which is executed with the computer program;

providing information from the trace definition file to a host processor;

the host processor communicating with the GSM receiver to identify selected parts of the computer program to be traced;

in response to execution of the computer program transmitting trace information from the GSM receiver to the host processor associated with the selected parts of the computer program being traced; and the host processor, in response to transmission of the trace information from the GSM receiver and in response to the information provided from the trace definition file causing the output for enabling tracing of the execution of the selected parts of the computer program.

22. A method in accordance with claim 21 wherein:

the output is displayed; and the selected information provided from the trace definition file to the data processing system executed with the computer program and from the GSM receiver to the host processor comprises the encoded identification of each trace definition.

23. A method in accordance with claim 22 wherein:

the trace definition file further includes parameters of the trace information; and the selected information provided from the trace definition file to the data processing system which is executed with the computer program and from the GSM receiver to the host processor further comprises the parameters of the trace information.

24. A method in accordance with claim 23 wherein:

the encoded identification of each trace data is a unique symbolic identity thereof; and each unique symbolic identity is converted to a unique numerical identification thereof which is compiled as part of the computer program.

25. A method in accordance with claim 24 wherein:

the trace definition file is compiled to generate the selected information provided to the GSM receiver and the host processor.

26. A method in accordance with claim 22 wherein:

the encoded identification of each trace data is a unique symbolic identity thereof; and each unique symbolic identity is converted to a unique numerical identification thereof which is compiled as part of the computer program.

27. A method in accordance with claim 26 wherein:

the trace definition file is compiled to generate the selected information provided to the GSM receiver and the host processor.

28. A method in accordance with claim 22 wherein:

the trace definition file is compiled to generate the selected information provided to the GSM receiver and the host processor.

29. A method in accordance with claim 23 wherein:

the trace definition file is compiled to generate the selected information provided to the GSM receiver and the host processor.

30. A method in accordance with claim 21 wherein:

the encoded identification of each trace definition is a unique numerical identification thereof.

31. A method in accordance with claim 30 wherein:

the encoded identification of each trace data is a unique symbolic identity thereof; and each unique symbolic identity is converted to a unique numerical identification thereof which is compiled as part of the computer program.

32. A method in accordance with claim 31 wherein:

the trace definition file is compiled to generate the selected information provided to the GSM receiver and the host processor.

33. A method in accordance with claim 30 wherein:

the trace definition file is compiled to generate the selected information provided to the GSM receiver and the host processor.

34. A method in accordance with claim 21 wherein:

the encoded identification of each trace definition is a unique symbolic identity thereof; and each unique symbolic identity is converted to a unique numerical identification thereof which is compiled as part of the computer program.

35. A method in accordance with claim 34 wherein:

the trace definition file is compiled to generate the selected information provided to the GSM receiver and the host processor.

36. A method in accordance with claim 21 wherein:

the trace definition file is compiled to generate the selected information provided to the GSM receiver and the host processor.

* * * * *